United States Patent
Wu (10) Patent No.: US 8,650,418 B2
(45) Date of Patent: Feb. 11, 2014

(54) POWER-SAVING MANAGEMENT METHOD FOR COMPUTER PERIPHERAL DEVICE AND SYSTEM THEREOF

(75) Inventor: Kun Hsiung Wu, Taipei County (TW)

(73) Assignee: Kye Systems Corporation, San Chung, Taipei (TW)

( * ) Notice: Subject to any disclaimer, the term of this patent is extended or adjusted under 35 U.S.C. 154(b) by 643 days.

(21) Appl. No.: 12/591,813

(22) Filed: Dec. 2, 2009

(65) Prior Publication Data

US 2011/0060930 A1   Mar. 10, 2011

(30) Foreign Application Priority Data

Sep. 4, 2009   (TW) .............................. 98129975 A (51) Int. Cl.
| | |
|---|---|
| G06F 1/32 | (2006.01) |
| G06F 1/24 | (2006.01) |
| G06F 1/26 | (2006.01) |
| G06F 13/10 | (2006.01) |

(52) U.S. Cl.
USPC ........... 713/320; 713/300; 713/310; 713/321; 713/323; 713/324; 710/8; 710/10; 710/15; 710/18

(58) Field of Classification Search
USPC .................. 713/300, 310, 320–324, 330, 340
See application file for complete search history.

(56) References Cited

U.S. PATENT DOCUMENTS

| 5,854,621 | A | 12/1998 | Junod et al. | |
|---|---|---|---|---|
| 6,269,449 | B1 * | 7/2001 | Kocis | 713/310 |
| 6,859,196 | B2 | 2/2005 | Kehlstadt | |
| 7,124,312 | B2 * | 10/2006 | Casebolt et al. | 713/323 |
| 7,995,034 | B2 * | 8/2011 | Pope et al. | 345/163 |

* cited by examiner

Primary Examiner — Fahmida Rahman
(74) Attorney, Agent, or Firm — Bacon & Thomas, PLLC (57) ABSTRACT

A power-saving management method for a computer peripheral device and a system thereof are described, which are applicable to stop the operation of at least one functional electronic element of the computer peripheral device, when the computer peripheral device enters a power-saving mode. The method includes the following steps. A sensor is activated to detect an environmental parameter value of the computer peripheral device. If the environmental parameter value is changed, the functional electronic element is activated to enter an operating mode, and an operation state of the functional electronic element is detected within a counting time. If the functional electronic element does not perform any operation, the sensor is reset and records the finally changed environmental parameter value, and the functional electronic element is made to enter the power-saving mode once again.

10 Claims, 5 Drawing Sheets

POWER-SAVING MANAGEMENT METHOD FOR COMPUTER PERIPHERAL DEVICE AND SYSTEM THEREOF

CROSS-REFERENCE TO RELATED APPLICATIONS

This non-provisional application claims priority under 35 U.S.C. §119(a) on Patent Application No(s). 098129975 filed in Taiwan, R.O.C. on Sep. 4, 2009, the entire contents of which are hereby incorporated by reference.

BACKGROUND OF THE INVENTION

1. Field of the Invention

The present invention relates to a power-saving management method and a system thereof, and more particularly to a power-saving management method for a computer peripheral device and a system thereof.

2. Related Art

With the rapid progress of wireless technologies, many computer peripheral devices (for example, a wireless mouse, a wireless keyboard, a trackball, a game console, and a digitizing tablet) adopt a wireless communication design as a communication bridge with a computer host. Due to the wireless design, the power source must be supplied by a battery installed on the computer peripheral device itself. An electrical quantity of the battery is limited, and in order to eliminate the trouble of frequently replacing the battery, a technology for saving the electrical quantity is designed for the computer peripheral device. Accordingly, when the computer peripheral device is not operated, it normally keeps a low electrical quantity mode (power-saving mode), in which the low electrical quantity mode is also called a sleep mode.

In the design of the power-saving state, mainly some electronic elements with a high power consumption, for example, a microcontroller unit (MCU) and an optical sensor, are enabled to stop working when they are not operated by a user, and the electronic elements are then activated when they are resumed to be operated by the user, so as to save an electrical power when they are not operated by the user. Through such a technology, a longer service life of the battery may be reached.

Generally, when the computer peripheral device is in a power-saving mode, many electronic elements in the computer peripheral device are power down. However, a wake-up technology must be designed for the computer peripheral device having a power-saving mode, such that the computer peripheral device is enabled to return from the low electrical quantity mode in the power-saving state to a wake-up mode in an operation state.

Usually, the technologies of the power-saving mode of many computer peripheral devices are approximately the same. However, the technologies associated with the wake-up mode have many varied designs. For example, in every pre-determined time period, a wake-up signal is output, so as to detect whether the user operates the computer peripheral device or not. Although the periodical detection about whether the user operates the computer peripheral device or not costs a quite short time, the computer peripheral device must be usually waken up, such that the power consumption is still high.

In order to further save the power, in many designs, the operating motion of the user is directly detected. For example, in U.S. Pat. No. 5,854,621, the wake-up operation is achieved by using press keys or moving signals of the device itself. Although the manner is quite convenient, when the press keys are pressed in the wake-up manner, unnecessary functions (for example, data deletion) are easily activated by mistake, so that it is not desirable in practice. In some other technologies, the wake-up operation is controlled by using capacitance change, for example, U.S. Pat. No. 6,859,196. However, a common problem of the above designs lies in neglecting quite a lot of external environment variables in order to obtain the using convenience, although the wake-up function can be achieved. Regardless of whether a vibration sensing manner or a capacitance sensing manner is used as a reference for switching the power-saving mode, unnecessary vibration or touch motion easily occurs when the computer peripheral device is carried along, so that the computer peripheral device is easily waken up by mistake, and the user is even not aware of such a circumstance. Due to the above reasons, the computer peripheral device cannot always maintain the power-saving mode, and the repeated wake-up operations of the computer peripheral device may easily result in excessively high power consumption.

SUMMARY OF THE INVENTION

In view of the above problems, the present invention is a power-saving management method for a computer peripheral device and a system thereof, which are applicable to correspondingly adjust an environmental parameter value set for waking up the computer peripheral device according to external environment factors of the computer peripheral device, thereby effectively managing a using situation of a power source of the computer peripheral device.

The present invention provides a power-saving management method for a computer peripheral device, which is applicable to stop the operation of at least one functional electronic element of the computer peripheral device when the computer peripheral device enters a power-saving mode. The method comprises the following steps.

Firstly, a sensor of the computer peripheral device is activated to detect an environmental parameter value of the computer peripheral device. Next, it is determined whether the environmental parameter value detected by the sensor is changed or not. Then, if the environmental parameter value is changed, the functional electronic element is activated to operate, and it is detected whether the computer peripheral device performs signal transmission with a computer host or not within a counting time. After the counting time elapsed, if the computer peripheral device does not perform any signal transmission, the sensor is reset and records the finally changed environmental parameter value, and the computer peripheral device is made to enter the power-saving mode once again.

In addition, in order to achieve the above objective, the present invention provides a power-saving management system for a computer peripheral device, which comprises a power source supplier, an MCU, and a sensor. The power source supplier provides a power required by a functional electronic element during operation. The MCU is electrically connected to the power source supplier, controls the power source to power-on or power-off the functional electronic element, and further has a timing circuit and a reset circuit. The sensor is electrically connected to the MCU.

Through the power-saving management method for the computer peripheral device and the system thereof, by resetting the sensor of the computer peripheral device, the sensor updates the external environmental parameter value of the computer peripheral device at any time, so as to automatically set the environmental parameter value for waking up the computer peripheral device. Furthermore, the mis-operation problem in the prior art is solved, thereby achieving an optimal allocation in the power-saving management operation of the power source.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

In a power-saving management method for a computer peripheral device and a system thereof according to the present invention, the computer peripheral device is made to perform signal transmission with a computer host. The computer peripheral device comprises, but is not limited to, a mouse, a trackball, a keyboard, a digitizing tablet, a game console, a digital photo frame, a sounder, a digital camera, a webcam, a cell phone, a multimedia player (MP3), or other computer peripheral devices capable of being operated by a user and connected to the computer host. The computer host comprises, but is not limited to, a desktop computer, an industrial computer, a notebook computer, a tablet PC, or other computer devices. In the following specific embodiments, the mouse and the digitizing tablet are taken as the preferred embodiments of the present invention, but it is not limited here.

Figure 1:
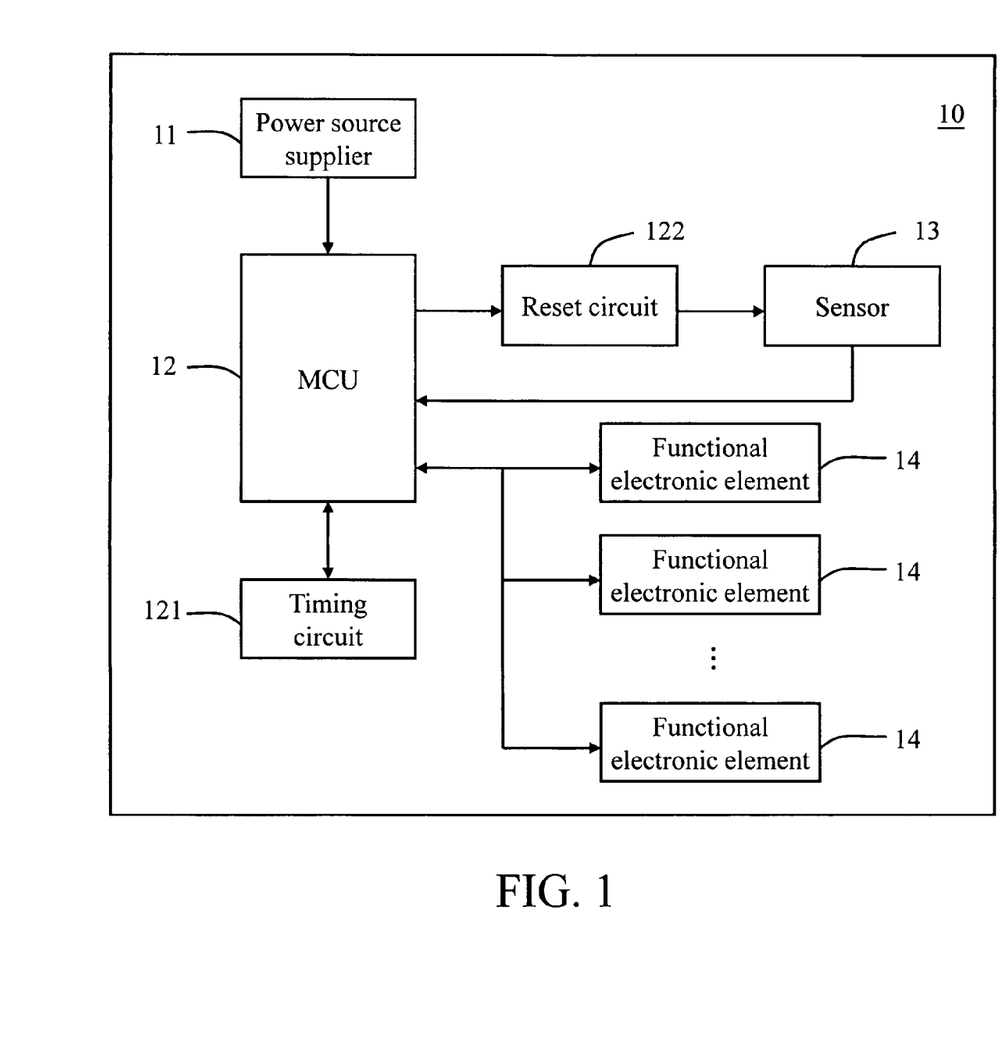
FIG. 1 is a schematic block diagram of a power-saving management system according to an embodiment of the present invention.

FIG. 1 is a schematic block diagram of a power-saving management system according to an embodiment of the present invention. Referring to FIG. 1, in a power-saving management system for a computer peripheral device according to the present invention, a computer peripheral device 10 comprises a power source supplier 11, an MCU 12, a sensor 13, and at least one functional electronic element 14. In this embodiment, the computer peripheral device 10 takes a wireless mouse as a preferred embodiment, but it is not limited here.

The power source supplier 11 provides a power required by the computer peripheral device 10 (for example, the wireless mouse) during operation, and the power source may be classified into an internal power source or an external power source according to the power supplying type. In this embodiment, by taking an internal power source as an example, the power source supplier 11 may be, but not limited to, a storage battery or a dry battery. The power source supplier 11 may also be an external power source. Particularly, the computer peripheral device 10 is connected to the computer host (not shown) through a wire (not shown), and the computer host provides an external power source to the computer peripheral device 10 during operation. In this manner, the MCU 12 controls an ON or OFF of the external power source of the computer host, so as to drive the functional electronic element 14 to operate.

The MCU 12 is electrically connected to the power source supplier 11, so as to detect a type and a power source electrical quantity state of the power source supplier 11, and control the ON or OFF of the power source of the power source supplier 11, thereby driving the functional electronic element 14 to operate. Furthermore, the MCU 12 is further electrically connected to a timing circuit 121 and a reset circuit 122. The timing circuit 121 detects whether the computer peripheral device 10 performs signal transmission or not within a counting time. After receiving a reset signal sent from the MCU 12, the reset circuit 122 resets the sensor 13 to update a finally detected environmental parameter value.

The sensor 13 is electrically connected to the MCU 12, and the sensor 13 is a touch sensor (for example, a capacitance sensor or a resistance sensor). For example, the sensor 13 may be designed into a capacitance touch panel or a resistance touch panel, and may be disposed on an outer case of the computer peripheral device 10 to form a sensing region. Then, a finger, a touch pen (digital pen) or the like is used to directly contact the sensor 13, so as to generate a sensing signal of an environmental parameter value (for example, a capacitance value or a resistance value) to the MCU 12. In the description of the following embodiments, the sensor 13 takes a touch capacitance sensor as a preferred embodiment, but it is not limited here.

The functional electronic element 14 is electrically connected to the MCU 12, and the functional electronic element 14 may be an optical sensing element, a sensing antenna element, a scroll wheel element, a mouse button element, or electronic elements with other functions of the wireless mouse. The functional electronic element 14 of the wireless mouse is known in the prior art, so it is not described here. In addition, the computer peripheral device 10 performs signal transmission with the computer host through the functional electronic element 14. The so-called signal transmission refers to an output signal of a left or right mouse button or a scroll wheel, an output signal of an optical sensing direction of the optical sensing element, or a wireless output signal transmitted by the sensing antenna element of the computer peripheral device 10 (the wireless mouse).

Figure 2:
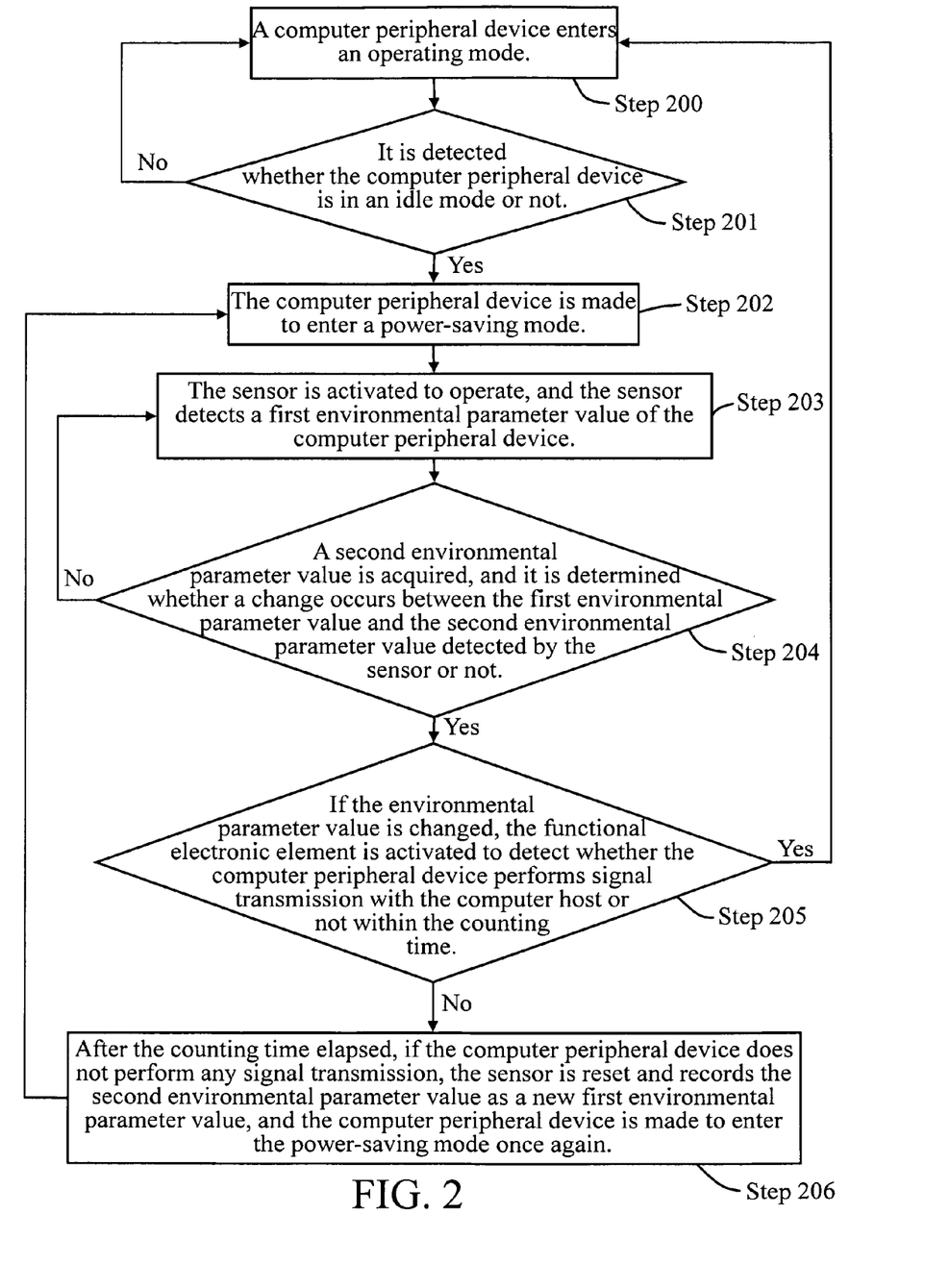
FIG. 2 is a schematic flow chart of a power-saving management system according to an embodiment of the present invention.

FIG. 2 is a schematic flow chart of a power-saving management system according to an embodiment of the present invention. Referring to FIG. 2, firstly, the computer peripheral device 10 enters an operating mode (Step 200). In the operating mode, the power source supplier 11 provides an electrical power to the MCU 12, and the MCU 12 further transmits the electrical power to the functional electronic element 14, so as to drive the functional electronic element 14 to operate, thereby driving the computer peripheral device 10 to perform signal transmission with the computer host (not shown).

Then, it is detected whether the computer peripheral device 10 is in an idle mode or not (Step 201). In the idle mode, the timing circuit 121 is activated to detect whether the computer peripheral device 10 performs signal transmission with the computer host (not shown) or not within a counting time.

Then, the computer peripheral device 10 is made to enter a power-saving mode (Step 202). As for the power-saving mode, if the computer peripheral device 10 does not perform any signal transmission, the MCU 12 stops providing the electrical power to the functional electronic element 14, such that the functional electronic element 14 pauses the operation. In other words, the computer peripheral device 10 cannot perform any signal transmission with the computer host (not shown), so as to avoid consuming the power source electrical quantity.

After the computer peripheral device 10 enters the power-saving mode, the following steps are performed. The sensor 13 is activated to operate, and the sensor 13 detects a first environmental parameter value of the computer peripheral device (Step 203). After the computer peripheral device 10 enters the power-saving mode, the MCU 12 only provides the electrical power for the sensor 13 to operate, and the sensor 13 detects the environmental parameter value around the computer peripheral device 10. For example, after being disposed on the outer case of the computer peripheral device 10, the sensor 13 (for example, a touch capacitance sensor) may form a sensing region with a uniform electric field on the outer case. If a finger or another article contacts the sensing region, the electric field is changed, such that a capacitance value is changed, and the capacitance value detected by the sensor 13 is the environmental parameter value, and the capacitance value detected at the first time is the first environmental parameter value.

A second environmental parameter value is acquired, and it is determined whether a change occurs between the first environmental parameter value and the second environmental parameter value detected by the sensor 13 or not (Step 204). Usually, the so-called change refers that the first environmental parameter value (an initial environmental parameter value) is suddenly changed, and then the second environmental parameter value (different from the initial environmental parameter value) is detected.

If the environmental parameter value is changed, the functional electronic element 14 is activated to detect whether the computer peripheral device 10 performs signal transmission with the computer host or not within a counting time (Step 205). When the environmental parameter value detected by the sensor 13 is changed, the sensor 13 sends a sensing signal to the MCU 12. Then, the MCU 12 provides the electrical power again to the functional electronic element 14, so as to wake up the functional electronic element 14 to resume operating. Furthermore, it is further determined whether the computer peripheral device 10 transmits any signal to the computer host or not within the counting time.

After the counting time elapsed, if the computer peripheral device 10 does not perform any signal transmission, the sensor 13 is reset and records the second environmental parameter value as a new first environmental parameter value, and the computer peripheral device 10 is made to enter the power-saving mode once again (Step 206). Particularly, the timing circuit 121 detects whether the computer peripheral device 10 performs the signal transmission with the computer host (not shown) or not within the same counting time. If it is confirmed that the computer peripheral device 10 does not perform any signal transmission, the MCU 12 sends a reset signal to the reset circuit 122, such that the reset circuit 122 controls the sensor 13 to perform a reset motion. Thus, the sensor 13 updates the finally acquired environmental parameter value (that is, the second environment reference value), so that the finally acquired environmental parameter value becomes a new initial environmental parameter value (that is, a first environment reference value), and then the computer peripheral device 10 enters the power-saving mode once again.

For example, when the computer peripheral device 10 (for example, the wireless mouse) enters the power-saving mode, the sensor 13 is activated to start operating, and the sensor 13 detects and records the environmental parameter value (for example, the resistance value or the capacitance value) around the computer peripheral device 10. If the sensor 13 is carelessly touched by mistake (for example, the computer peripheral device 10 is touched by a pencil or another article by mistake), the environmental parameter value detected by the sensor 13 is changed, so as to drive the functional electronic element 14 to operate again (that is, entering the operating mode). Meanwhile, the timing circuit 121 detects whether the functional electronic element 14 transmits a signal to the computer host or not within the counting time. If the computer peripheral device 10 does not perform any signal transmission within the counting time, it is determined that a mis-operation condition of the sensor 13 is true. Therefore, the reset circuit 122 immediately resets the sensor 13, so that the sensor 13 automatically records the final environmental parameter value once again, and thus the sensor 13 is corrected once again, thereby preventing the mis-operation situation.

Figure 3:
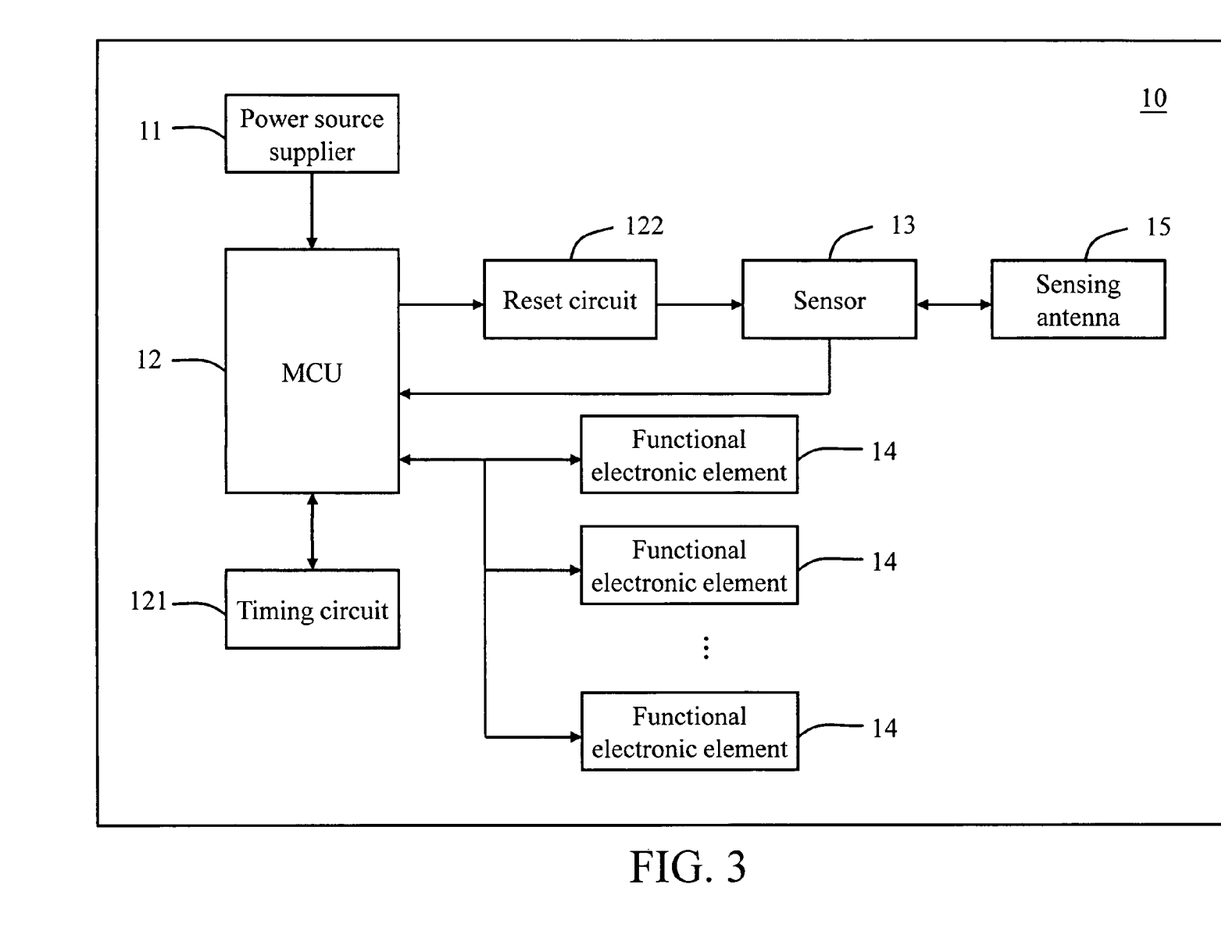
FIG. 3 is a schematic block diagram of a power-saving management system according to another embodiment of the present invention.

FIG. 3 is a schematic block diagram of a power-saving management system according to another embodiment of the present invention. The specific implementing manner is approximately the same as that of the above embodiment, so merely the differences are described in the following. Referring to FIG. 3, the power-saving management system for the computer peripheral device according to the present invention further comprises at least one sensing antenna 15, and the sensing antenna 15 is electrically connected to the sensor 13. Furthermore, the sensing antenna 15 is disposed close to the outer case of the computer peripheral device, so as to form a sensing antenna region on the outer case, and the sensor 13 may be disposed in the computer peripheral device 10.

In this manner, the sensor 13 may detect the environmental parameter value around the computer peripheral device 10 through the sensing antenna 15. When the user approaches the sensing antenna region with a hand, the user's hand forms a capacitance effect with the sensing antenna 15. On the contrary, when the user's hand leaves the sensing antenna region, the capacitance effect disappears. In this manner, the sensor 13 detects the environmental parameter value around the computer peripheral device 10. If it is detected that the computer peripheral device 10 does not perform any signal transmission within the counting time, the computer peripheral device 10 is made to enter the power-saving mode.

Figure 4:
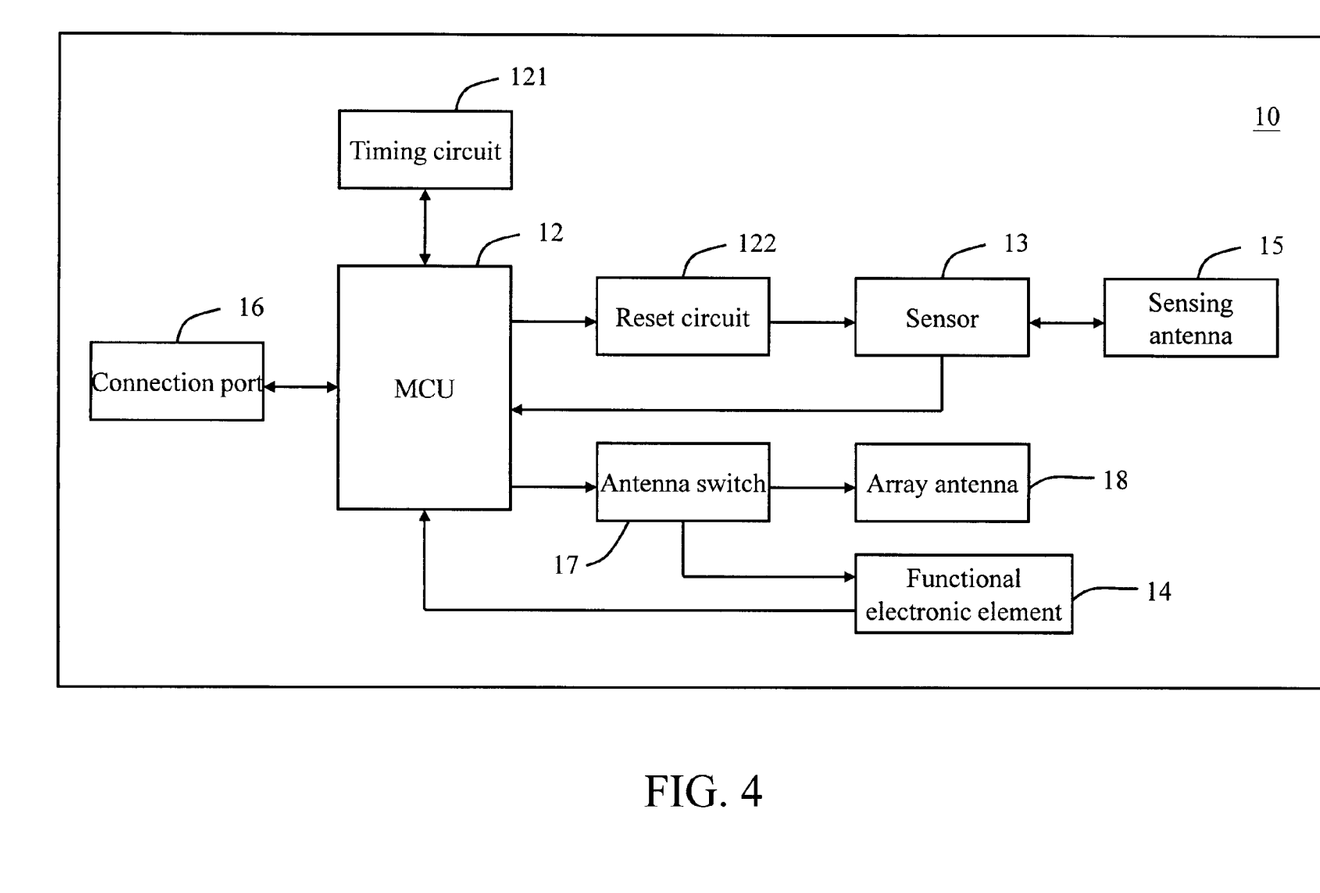
FIG. 4 is a schematic block diagram of a power-saving management system according to still another embodiment of the present invention.

FIG. 4 is a schematic block diagram of a power-saving management system according to still another embodiment of the present invention. The specific implementing manner is approximately the same as that of the above embodiment, so merely the differences are described in the following. Referring to FIG. 4, in the power-saving management system for the computer peripheral device according to the present invention, the computer peripheral device 10 is a digitizing tablet. The computer peripheral device 10 further comprises a connection port 16, an antenna switch 17, and an array antenna 18. The connection port 16 is electrically connected to the MCU 12. The connection port 16 may be a universal serial bus (USB) port, and is connected to the computer host (not shown) through a wire (not shown), thereby transmitting a signal of the computer peripheral device 10 to the computer host. Through the connection port 16, the computer host provides an external power for the computer peripheral device 10 to operate.

The antenna switch 17 is electrically connected to the MCU 12, and the MCU 12 controls an ON or OFF of an external power source of the computer host, so as to drive the antenna switch 17 to operate. In addition, the antenna switch 17 is also electrically connected to the functional electronic element 14 and the array antenna 18. The functional electronic element 14 may be a detective loop, a signal amplifier, an analog to digital converter (ADC), an auto gain control, a signal rectifier, or electronic elements with other functions of the digitizing tablet. The functional electronic element 14 of the digitizing tablet is known in the prior art, so it is not described here.

For the array antenna 18, an x axis antenna and a y axis antenna are arranged on a surface of a circuit board, so as to sense a magnetic field of an electromagnetic pen, so that the functional electronic element 14 of the digitizing tablet is enabled to calculate and transmit the coordinates of the electromagnetic pen to the computer host. In addition, the computer peripheral device 10 performs signal transmission with the computer host through the functional electronic element 14, in which the signal transmission may be a coordinate output signal or a click output signal of the computer peripheral device 10 (the digitizing tablet).

For example, when the computer peripheral device 10 (for example, the digitizing tablet) enters the power-saving mode, the sensor 13 is activated to start operating, and the sensor 13 is electrically connected to the sensing antenna 15. The sensing antenna 15 forms a sensing antenna region on the computer peripheral device 10. In this manner, the sensor 13 detects the environmental parameter value around the computer peripheral device 10 through the sensing antenna 15. For example, when the user approaches the sensing antenna region with a hand or a digital pen, the user's hand or the digital pen forms a capacitance effect with the sensing antenna 15, so as to produce a change of a capacitance value, such that the capacitance value detected by the sensor 13 is the environmental parameter value and is recorded.

If the environmental parameter value detected by the sensor 13 is changed, the MCU 12 drives the antenna switch 17 to operate again, and the antenna switch 17 turns on the functional electronic element 14 and the array antenna 18 to operate (that is, entering the operating mode). Meanwhile, the timing circuit 121 detects whether the functional electronic element 14 transmits a signal to the computer host or not within the counting time. If the computer peripheral device 10 does not transmit any signal within the counting time, it is determined that a mis-operation condition of the sensor 13 is true. Therefore, the reset circuit 122 immediately resets the sensor 13, and the sensor 13 automatically records the final environmental parameter value once again (that is, the second environment reference value) as a new initial environment parameter value (that is, a first environment reference value), and the sensor 13 is corrected once again, thereby preventing the mis-operation situation.

Figure 5:
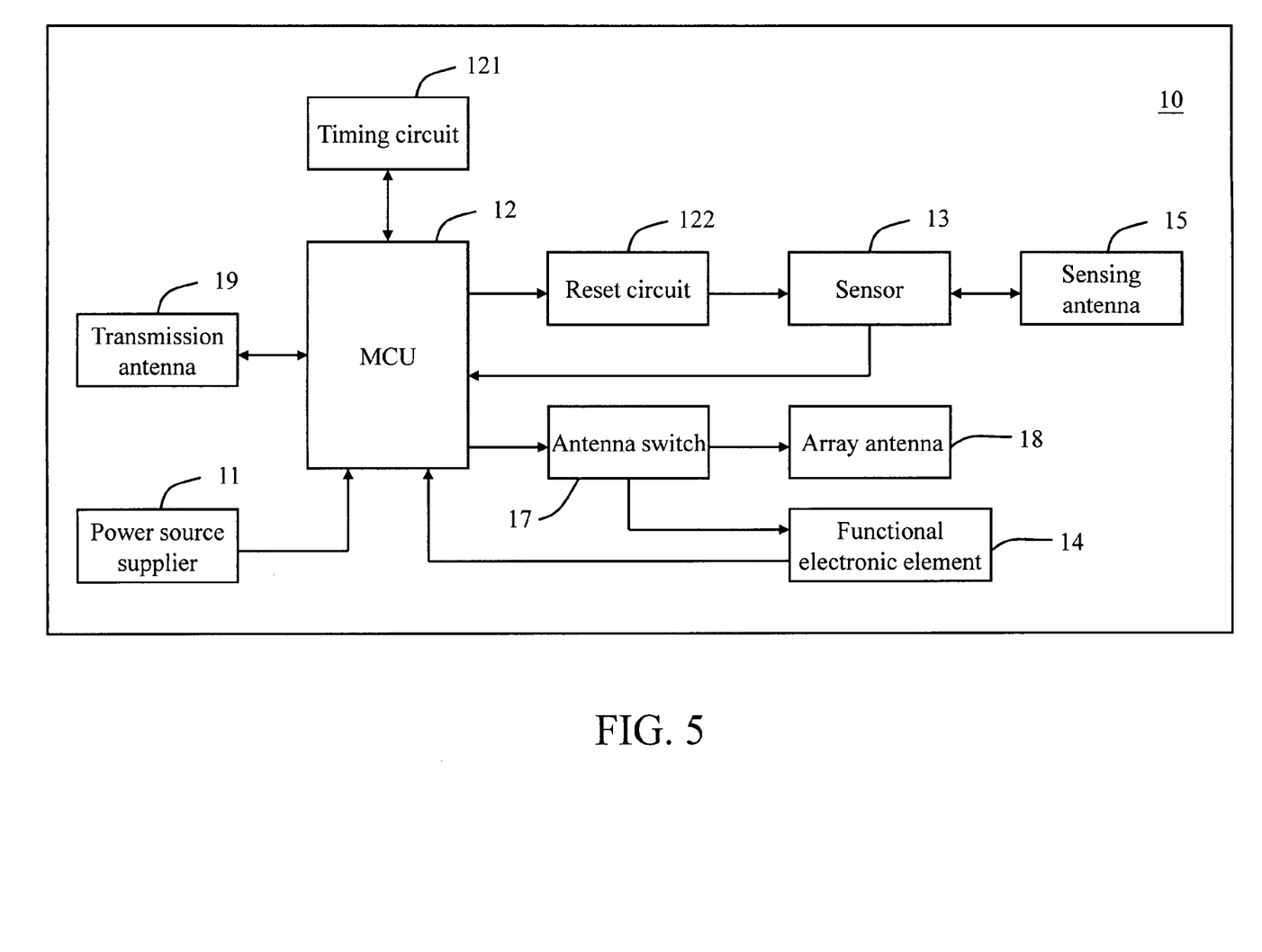
FIG. 5 is a schematic block diagram of a power-saving management system according to yet another embodiment of the present invention.

FIG. 5 is a schematic block diagram of a power-saving management system according to yet another embodiment of the present invention. The specific implementing manner is approximately the same as that of the above embodiment, so merely the differences are described in the following. Referring to FIG. 5, the power-saving management system for the computer peripheral device according to the present invention further comprises a transmission antenna 19, and the transmission antenna 19 is electrically connected to the MCU 12. The functional electronic element 14 transmits a computed signal to the transmission antenna 19 through the MCU 12, and then the transmission antenna 19 wirelessly transmits the signal to the computer host for being received and computed.

Through the power-saving management method for the computer peripheral device and the system thereof, by using the function of resetting the sensor, the sensor automatically updates the environmental parameter value of the computer peripheral device, so as to set the environmental parameter value for waking up the computer peripheral device at any time. Furthermore, the mis-operation problem in the prior art is solved, thereby effectively managing a using situation of the power source in the power-saving mode.

What is claimed is:

1. A power-saving management method for a computer peripheral device, suitable for stopping an operation of at least one functional electronic element and a plurality of array antennas of the computer peripheral device when the computer peripheral device enters into a power-saving mode, the method comprising:

activating a sensor of the computer peripheral device, and detecting a first environmental parameter value of the computer peripheral device by the sensor;

acquiring a second environmental parameter value, and determining whether a change occurs between the first environmental parameter value and the second environmental parameter value detected by the sensor or not;

activating the functional electronic element and the array antennas to operate when the first environmental parameter value is changed, and detecting whether the computer peripheral device performs a signal transmission with a computer host or not within a counting time; and resetting the sensor, if the computer peripheral device does not perform any signal transmission after the counting time elapses, recording the second environmental parameter value as the new first environmental parameter value by the sensor, and causing the computer peripheral device to enter into the power-saving mode once again.

2. The power-saving management method for the computer peripheral device according to claim 1, wherein the step of detecting the first environmental parameter value of the computer peripheral device by the sensor further comprises: electrically connecting a sensing antenna to the sensor, and forming a sensing antenna region on the computer peripheral device by the sensing antenna, such that the sensor detects the first environmental parameter value through the sensing antenna region of the sensing antenna.

3. The power-saving management method for the computer peripheral device according to claim 1, wherein when it is determined that the first environmental parameter value detected by the sensor is not changed, the sensor is further adapted to continuously detect the first environmental parameter value until after the first environmental parameter value is changed.

4. The power-saving management method for the computer peripheral device according to claim 1, wherein when the computer peripheral device is detected to perform the signal transmission with the computer host within the counting time, the computer peripheral device is further adapted to enter into an operating mode.

5. A power-saving management system for a computer peripheral device, suitable for stopping an operation of at least one functional electronic element of the computer peripheral device when the computer peripheral device enters into a power-saving mode, the system comprising:

a power source supplier, for providing a power required by the functional electronic element during operation;

a plurality of array antennas, electrically connected to the functional electronic element;

a microcontroller unit (MCU), electrically connected to the power source supplier and the array antennas, for controlling a power source of the power source supplier to power-on or power-off the functional electronic element and the array antennas, wherein the MCU comprises a timing circuit and a reset circuit; and a sensor, electrically connected to the MCU;

wherein in the power-saving mode, the MCU activates the sensor to detect a first environmental parameter value around the computer peripheral device; the sensor acquires a second environmental parameter value; when the sensor detects that a change occurs between the first environmental parameter value and the second environmental parameter value, the timing circuit detects an operation state of the functional electronic element within a counting time; and when the timing circuit detects that the functional electronic element does not operate, the reset circuit resets the sensor, and the sensor is adapted to record the second environmental parameter value as the new first environmental parameter value, and the computer peripheral device is adapted to enter into the power-saving mode once again.

6. The power-saving management system for the computer peripheral device according to claim 5, wherein the power source supplier is an internal power source, and the internal power source is a dry battery or a storage battery.

7. The power-saving management system for the computer peripheral device according to claim 5, wherein the power source supplier is an external power source, the external power source is provided to the computer peripheral device by a computer host through a connection port, and the connection port is disposed on the computer peripheral device.

8. The power-saving management system for the computer peripheral device according to claim 5, wherein the sensor is a touch capacitance sensor or a touch resistance sensor.

9. The power-saving management system for the computer peripheral device according to claim 5, further comprising: a sensing antenna, electrically connected to the sensor, wherein the sensing antenna forms a sensing antenna region on the computer peripheral device, such that the sensor detects the first environmental parameter value through the sensing antenna region of the sensing antenna.

10. The power-saving management system for the computer peripheral device according to claim 5, further comprising: an antenna switch, electrically connected to the array antennas, the MCU and the functional electronic element respectively, wherein the MCU switches an actuation of the antenna switch, so as to control the power source to power-on or power-off the functional electronic element and the array antennas.

* * * * *